United States Patent
Suzuki

(10) Patent No.: US 7,202,897 B2
(45) Date of Patent: Apr. 10, 2007

(54) SOLID-STATE IMAGE PICKUP EXPOSURE CONTROL SYSTEM AND METHOD

(75) Inventor: Ryoji Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 10/192,054

(22) Filed: Jul. 10, 2002

(65) Prior Publication Data

US 2003/0035059 A1   Feb. 20, 2003

(30) Foreign Application Priority Data

Jul. 11, 2001 (JP) ............................. 2001-210268
Jul. 11, 2001 (JP) ............................. 2001-210269

(51) Int. Cl.
*H04N 5/335* (2006.01)
*H04N 7/18* (2006.01)

(52) U.S. Cl. ...................... 348/296; 348/155

(58) Field of Classification Search ............ 348/222.1, 348/294, 296, 155, 362, 308
See application file for complete search history.

(56) References Cited

U.S. PATENT DOCUMENTS

| | | | | |
|---|---|---|---|---|
| 4,460,836 A | * | 7/1984 | Tsunekawa et al. | 327/515 |
| 5,926,214 A | * | 7/1999 | Denyer et al. | 348/241 |
| 6,011,251 A | * | 1/2000 | Dierickx et al. | 250/208.1 |
| 6,115,065 A | * | 9/2000 | Yadid-Pecht et al. | 348/308 |
| 6,975,355 B1 | * | 12/2005 | Yang et al. | 348/308 |
| 2002/0067415 A1 | * | 6/2002 | Denyer et al. | 348/294 |

FOREIGN PATENT DOCUMENTS

| | | |
|---|---|---|
| JP | 02-241278 | 9/1990 |
| JP | 06-253216 | 9/1994 |
| JP | 2001-069408 | 3/2001 |

* cited by examiner

*Primary Examiner*—Vivek Srivastava
*Assistant Examiner*—Timothy J. Henn
(74) *Attorney, Agent, or Firm*—Robert J. Depke; Rockey, Depke, Lyons & Kitzinger LLC.

(57) ABSTRACT

If image data of a prior frame and image data of a current frame are compared with each other, a resulting image appears doubled because the distance of travel of an object within one frame becomes long when the object moves quickly.

In a focal-plane shutter type CMOS imager which performs exposure row by row, a shutter scanning circuit 32 performs exposure twice with exposure time divided into two durations on one pixel 11 in a pixel section 21. Signals based on the two exposure durations from the one pixel are read through respective vertical signal lines 25 and 26 under the control of vertical scanning circuits 30 and 31. The two signals are then synchronized through the delay circuit 42, and a difference between the two signals is determined through the subtracter 43, and the difference signal is output. The motion of an object is detected based on the difference signal.

16 Claims, 9 Drawing Sheets

FIRST VERTICAL
SCANNING PULSE

SECOND VERTICAL
SCANNING PULSE

READ PULSE

HORIZONTAL
SCANNING PULSE n-TH ROW, (n+1)-TH ROW

DIRECTION OF SCAN

DIRECTION OF SCAN

DIRECTION OF SCAN

SOLID-STATE IMAGE PICKUP EXPOSURE CONTROL SYSTEM AND METHOD

This application claims priority to Japanese Patent Application Nos. JP2001-210269 and JP2001-210268 each of which were filed on Jul. 11, 2001 and which are herein incorporated herein by reference.

BACKGROUND OF THE INVENTION

1. Field of the Invention

The present invention relates to a solid-state image pickup device, a method for driving the solid-state image pickup device, a motion detector, and a camera system and, more particularly to a solid-state image pickup device which successively reads a pixel signal from a pixel section, a method for driving the solid-state image pickup device, a motion detector that uses the solid-state image pickup device as an imaging device, and a camera system.

2. Description of the Related Art

The solid-state image pickup devices are mainly divided into a charge-transfer solid-state image pickup device such as a CCD imaging sensor and an X-Y addressing type solid-state image pickup device such as a CMOS imager. These two types are different in operation in the following point. Specifically, the charge-transfer type solid-state image pickup device concurrently starts storage of signal charge on all pixels and concurrently reads signal charge from all pixels. All pixels have equal storage time (exposure time) of the signal charge. The X-Y addressing type solid-state image pickup device starts storage of signal charge on one row of pixels at a time or one pixel at a time, and successively reads, from the pixels, a signal based on the stored signal charge, by addressing each unit pixel. The storage time of the signal charge is different from pixel to pixel.

Motion detectors for detecting the motion of an object (subject) using an image pickup device as a detection sensor have been developed. When the solid-state image pickup is used as a detection sensor, not only the movement of the object is detected, but also the image of the moving object is recognized. For example, when the motion detector is used to detect the speed of a vehicle running on an expressway, the motion detector not only detects the speed of the vehicle, but also recognizes the type of vehicle and the number and characters printed on a number plate of the vehicle, which may run at a speed above a speed limit.

When the detection sensor is used as a solid-state image pickup device, image data of a prior frame is stored in a frame memory, and the image data of the prior frame is compared with image data of a current frame to detect the motion of the object. Specifically, when the object remains still, the image data in the prior frame and the image data in the current frame coincide with each other. The comparison results become zero. When the object is moving, the comparison results become the ones reflecting the motion.

In the above-mentioned conventional art, the image data in the prior frame and the image data in the current frame are compared with each other. The object moving at a fast speed moves by a long distance within one frame. Although the motion of the object is detected, the image of the object looks doubled, and it is difficult to correctly recognize the image.

The frequency of AC utility power source is different from area to area. For example, the AC utility power source in East Japan is 50 [Hz], while that in West Japan is 60 [Hz]. Illumination provided by a fluorescent lamp operated from the AC utility power source blinks in a sine wave having a frequency twice the frequency of the utility power source. The imaging operation of the image pickup device under the illumination provided by the fluorescent lamp is now considered. In the case of a so-called focal-plane shutter type X-Y addressing solid-state image pickup device which performs exposure on a pixel by pixel basis or on a row by row basis, the storage time is different from pixel to pixel or from row to row. When a high-speed electronic shutter is triggered, a bright streak and a dark streak alternate with each other every row on a screen. This phenomenon is called a flicker.

Now it is considered that an imaging operation is performed at a rate of 30 [frames/s] under the fluorescent illumination driven by the 50 [Hz] AC power source. At any particular pixel, signal reading from each pixel is performed with a period of 33.3 (1/30) [ms], namely, at a timing represented by a ♦ mark in FIG. 1 which illustrates a change in the wave of brightness (intensity) under the fluorescent lamp illumination.

When the high-speed electronic shutter is triggered, the signal of the pixel becomes an output value substantially proportional to the light intensity at the reading operation. There occurs a brightness difference between the bright horizontal streak and the dark horizontal streak, with the bright horizontal streak several times brighter than the dark horizontal streak. The brightness difference appears as a flickering. To reduce the flickering, the shutter speed is set to be $n/2A$ ($n=1, 2, 3, 4, \ldots$) with the driving frequency of the fluorescent lamp being A, and the storage time of the signal charge at each pixel is set to be n times the flicker period ($=1/2A$).

For example, with $n=1$, the shutter speed becomes 1/100 [s], and coincides with the illumination period (1/100 [s]) of the fluorescent lamp which blinks at the sine wave having the frequency twice the power source. At a given pixel, the signal reading is performed from the pixel with the period of 10 [ms] in accordance with the waveform diagram illustrated in FIG. 1. Since the signal intensity during the signal reading becomes equal among pixels, the generation of the flickering is controlled.

For example, if an imaging operation is performed under the illumination of the fluorescent lamp driven at the driving frequency A of 50 [Hz], the shutter speed is set to faster than 1/100 [s]. Since the shutter period is shorter than the period of the fluorescent lamp illumination, the signal reading from the pixel is carried out at a timing different by one peak in the waveform represented by a solid line in FIG. 1. For this reason, the bright horizontal streak is brighter than the dark horizontal streak by an integer multiple. In the 50 [Hz] AC utility power source area, the flicker reduction effect is not obtained when the electronic shutter is triggered at a speed faster than 1/100 [s].

When the imaging operation is performed at a rate of 30 [frames/s] in the 60 [Hz] AC utility power source area, the frequency of the AC utility power source has an integer multiple of the frame rate of the solid-state image pickup device. In principle, the problem of flickering does not occur. However, this is not the case If the frequency of the AC utility power source is not an integer multiple of the frame rate of the solid-state image pickup device in the 60 [Hz] AC utility power source area.

SUMMARY OF THE INVENTION

The present invention has been developed in view of the above problem. It is an object of the present invention to provide a solid-state image pickup device which accurately detects the movement of an object while correctly recognizes the image of the object even when the object moves quickly, a method for driving the solid-state image pickup device, and a motion detector.

It is another object to provide a solid-state image pickup device which substantially reduces the generation of flickering that occurs when a high-speed electronic shutter is triggered, a method for driving the solid-state image pickup device, and a camera system.

To achieve the above objects, in accordance with a first invention, a solid-state image pickup device having a pixel section formed of a matrix of unit pixels and successively reading a pixel signal from the pixel section by addressing each unit pixel, exposure time is set into two durations per pixel in the pixel section. Separate signals are read from each pixel in the pixel section, based on the two exposure durations, and the two signals read are synchronized and a difference between the two signals is determined and output. The motion of the object is detected based on the difference signal.

In the above-referenced solid-state image pickup device or a motion detector which uses the solid-state image pickup device as a detection sensor, two signals read at different timings are synchronized to determine a difference between the two signals and the motion of the object is detected based on the difference. The two signals are derived from the same pixel, and the time difference therebetween is extremely short. A high-speed electronic shutter operation is thus achieved. The area of the image nearly equal to the projection area of the object is obtained even when the object moves quickly. In this way, an accurate image of the object is recognized even when the object moves quickly.

In accordance with a second invention, in a solid-state image pickup device having a pixel section formed of a matrix of unit pixels, and successively reading a pixel signal from the pixel section by addressing each pixel, exposure time is set into at least two durations per pixel in the pixel section. Separate signals are read from each pixel in the pixel section, based on at least two exposure durations at separate timings spaced by the set duration substantially equal to half a flicker period of illumination. These signals read are synchronized and then summed.

In the above-referenced solid-state image pickup device or a camera system using the solid-state image pickup device as an imaging device, at least two separate signals read from one pixel at different timings are synchronized and summed. The pixel signal thus becomes the average of the two signal. When a signal is read from one pixel at a time, the output value of the signal varies in intensity by an integer multiple from timing to timing. In this arrangement, however, variations are limited to several tens of percents. A difference in brightness between the bright horizontal streak and the dark horizontal streak alternatingly appearing on the screen during the high-speed electronic shutter is controlled under the fluorescent lamp illumination.

DESCRIPTION OF THE PREFERRED EMBODIMENTS

A first embodiment of the present invention is discussed with reference to the drawings. In accordance with the first embodiment of the present invention, a solid-state image pickup device is a focal-plane shutter type X-Y address solid-state image pickup device in which exposure is performed on a row by row basis. In the discussion that follows, the X-Y addressing type solid-state image pickup device is applied as a CMOS imager.

Figure 2:
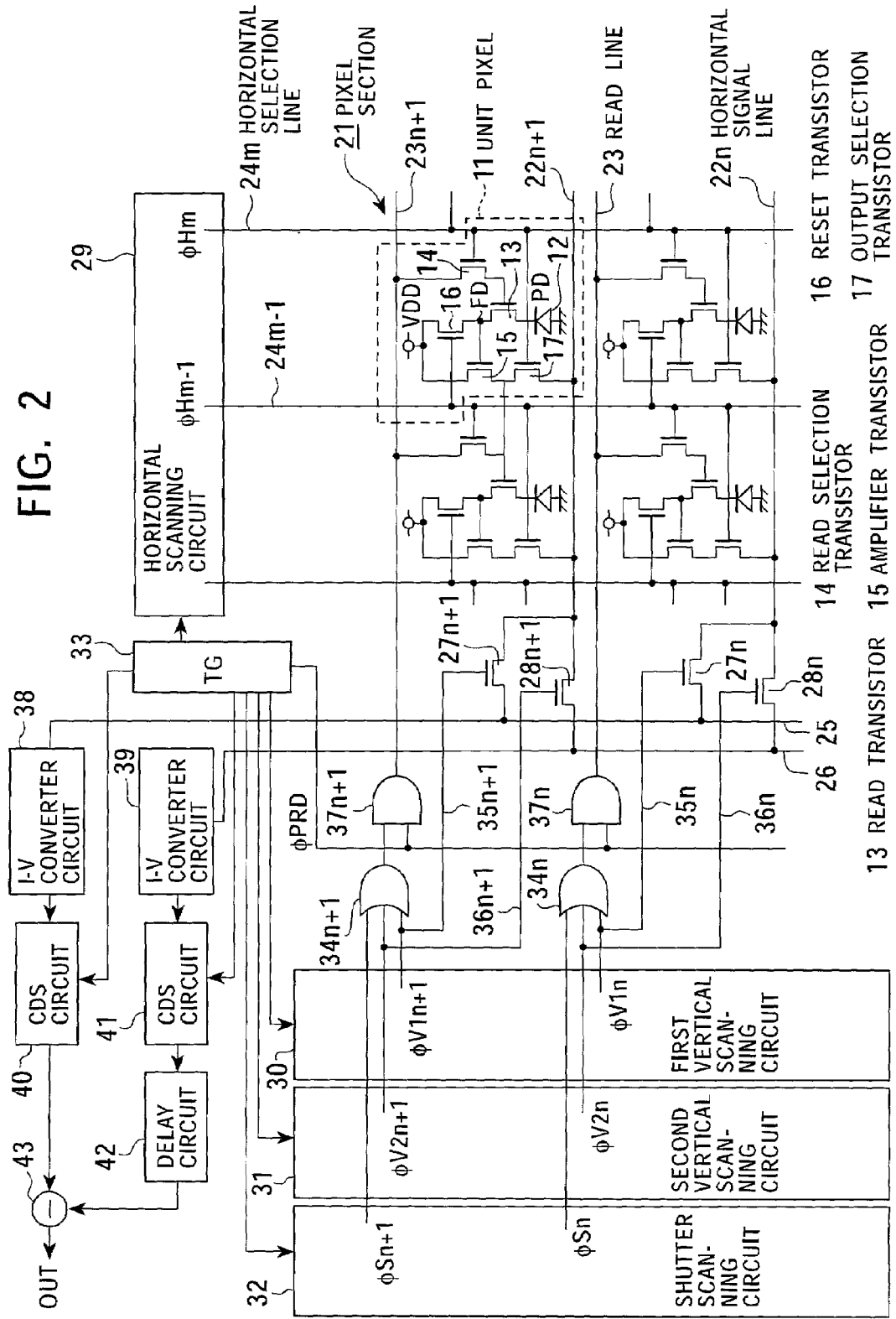
FIG. 2 is a block diagram illustrating a CMOS imager relating to a first embodiment of the present invention.

FIG. 2 is a block diagram illustrating the CMOS imager in accordance with the first embodiment. Referring to FIG. 2, a unit pixel 11 is represented by an area surrounded by a broken line. The unit pixel 11 includes five N-channel MOS transistors of a read transistor 13, a read selection transistor 14, an amplifier transistor 15, a reset transistor 16, and an output selection transistor 17 with respect to a photodiode (PD) 12 as a photoelectric conversion element. The unit pixels 11 are arranged in a matrix form, thereby forming a pixel section 21.

For simplification of FIG. 2, the pixel section 21 includes pixels of two columns ((m−1)-th and m-th) and two rows (n-th and (n+1)-th). Arranged in the pixel section 21 are horizontal signal lines 22n+1 and 22n and read lines 23n+1 and 23n. Further arranged are horizontal selection lines 24m−1 and 24m.

The construction of the unit pixel 11 at m-th column and (n+1)-th row is specifically discussed. In the unit pixel 11, the photodiode 12 performs one function of photoelectric conversion and another function of charge storage. Specifically, the photodiode 12 photoelectrically converts light into a signal charge (electrons in this example) having a charge quantity responsive to the light quantity of incident light and stores the signal charge. The photodiode 12 has a sensor structure with a diode embedded, in which a hole storage layer fabricated of a p+ layer is attached to the surface of an np diode substrate.

The source of the read transistor 13 is connected to the cathode of the photodiode 12. The read transistor 13 is configured with the drain thereof connected to a floating diffusion region FD as a storage area and with the gate thereof connected to the source/drain of the read selection transistor 14. The read selection transistor 14 is configured with the source/drain thereof connected to the read line 23n+1, and the gate thereof connected to the horizontal selection line 24m. The amplifier transistor 15 is configured with the gate thereof connected to the floating diffusion region FD and the drain thereof connected to a power source VDD.

The reset transistor 16 is configured with the source thereof connected to the floating diffusion region FD, the drain thereof connected to the power source VDD, and the gate thereof connected to the horizontal signal line 24m−1 at the (m−1)-th column adjacent thereto. The reset transistor 16 is of a depletion type to reset the potential of the floating diffusion region FD to the power source voltage VDD. The output selection transistor 17 is configured with the drain thereof connected to the source of the amplifier transistor 15, with the source thereof connected to the horizontal signal line 22n+1, and with the gate thereof connected to the horizontal selection line 24m.

A first vertical signal line 25 and a second vertical signal line 26 perpendicular to a plurality of rows, namely, the two rows of horizontal signal lines 22n and 22n+1 are routed external to the pixel section 21. A vertical selection transistor 27n is connected between the first vertical signal line 25 and the horizontal signal line 22n, a vertical selection transistor 27n+1 is connected between the first vertical signal line 25 and the horizontal signal line 22n+1, a vertical selection transistor 28n is connected between the second vertical signal line 26 and the horizontal signal line 22n, and a vertical selection transistor 28n+1 is connected between the second vertical signal line 26 and the horizontal signal line 22n+1. The vertical selection transistors 27n, 27n+1, 28n, and 28n+1 are also of an N-channel transistor.

A horizontal scanning circuit 29 for selecting columns is arranged as a horizontal driving system in a periphery of the pixel section 21. A first vertical scanning circuit 30 and a second vertical scanning circuit 31 for selecting rows, and a shutter scanning circuit 32 for an electronic shutter are arranged in the periphery of the pixel section 21 as a vertical driving system. The scanning circuits 29, 30, 31, and 32 are formed of shift registers, for example, and start a shifting operation (a scanning operation) in response to a drive pulse (a timing pulse) provided by a timing generator (TG) 33.

The horizontal scanning circuit 29 successively outputs horizontal scanning (selection) pulses φHm−1 and φHm. The horizontal scanning pulse φHm−1 is fed to the gate of the reset transistor 16 in the unit pixel 11 through the horizontal selection line 24m−1, and the horizontal scanning pulse φHm is fed to the gates of the read selection transistor 14 and the output selection transistor 17 in the unit pixel 11 through the horizontal selection line 24m. The first vertical scanning circuit 30 successively outputs first vertical scanning pulses φV1n and φVn+1, the second vertical scanning circuit 31 successively outputs second vertical scanning pulses φV2n and φV2n+1, and the shutter scanning circuit 32 successively outputs shutter pulses φSn and φSn+1.

On a row by row basis, the first vertical scanning pulses φV1 and φV1n+1 are respectively input to three-input OR gates 34n and 34n+1 as the first inputs thereto, while also being respectively fed to the gates of vertical selection transistors 27n and 27n+1 via vertical selection lines 35n and 35n+1. On a row by row basis, second vertical scanning pulses φV1n and φV2n+1 are respectively input to the OR gates 34n and 34n+1 as the second inputs thereto while also being respectively fed to the gates of the vertical selection transistors 28n and 28n+1 through via vertical selection lines 36n and 36n+1. On a row by row basis, the shutter pulses φSn and φSn+1 are respectively fed to the OR gates 34n and 34n+1 as the third inputs thereto.

The outputs of the OR gates 34n and 34n+1 are respectively fed to two-input AND gates 37n and 37n+1 as inputs thereto. A read pulse φPRD output from a timing generator 33 is fed to the AND gates 37n and 37n+1 as the other inputs thereto. The outputs of the AND gates 37n and 37n+1 are respectively fed to the drains of the read selection transistors 14 in each pixel through the read lines 23n and 23n+1.

Arranged on the output terminals of the first vertical signal lines 25 and 26 are respectively I (current)-V (voltage) converter circuits 38 and 39 and correlated double sampling (CDS) circuits 40 and 41 as a difference circuit. The I-V converter circuits 38 and 39 converts pixel signals in the form of current supplied through the first and second vertical signal lines 25 and 26 into voltage signals and feed the voltage signals to the CDS circuits 40 and 41.

The CDS circuits 40 and 41 determine difference between a noise level immediately subsequent to the pixel reset and a signal level in response to the sampling pulse supplied from the timing generator 33. The signal read through the first vertical signal line 25 and the signal read through the second vertical signal line 26 are pixel signals which are read from the same pixel at two different timings as will be discussed later. There is a constant time difference between the two signals. Specifically, the signal read through the first vertical signal line 25 is delayed by a constant time from the signal read through the second vertical signal line 26.

To compensate for the time difference and to synchronize the signal read through the first vertical signal line 25 with the signal read through the second vertical signal line 26, a delay circuit 42 for delaying the output signal from the CDS circuit 41 by a constant time is arranged as a subsequent stage to the CDS circuit 41. A known circuit such as a frame memory or a delay line is used as the delay circuit 42. The output signal from the CDS circuit 40 and the output signal output from the CDS circuit 41 and the delay circuit 42 are fed to a subtracter 43. The subtracter 43 determines the difference between the two signals and successively outputs the difference as a difference signal on a dot at a time basis.

The level of the difference signal occasionally becomes lower than a black level when the subtracter 43 performs subtraction onto the two signals. An unshown subsequent signal processing circuit must perform a level shifting operation to raise the black level of the difference signal.

The first and second vertical scanning circuits 30 and 31 successively output two vertical scanning pulses of the first vertical scanning pulse φV1n and the second vertical scanning pulse φV2n with a constant time interval allowed therebetween. The shutter scanning circuit 32 outputs two shutter pulses φSn having the same interval to respective vertical scanning pulses φV1n and φV2n so that the same storage time is allowed prior to each of the two vertical scanning pulses φV1 and φV2. The interval between the two shutter pulses φSn is set to any duration of time. The timing relationship between these pulses is determined based on a variety of timing pulses provided by the timing generator 33.

Figure 3:
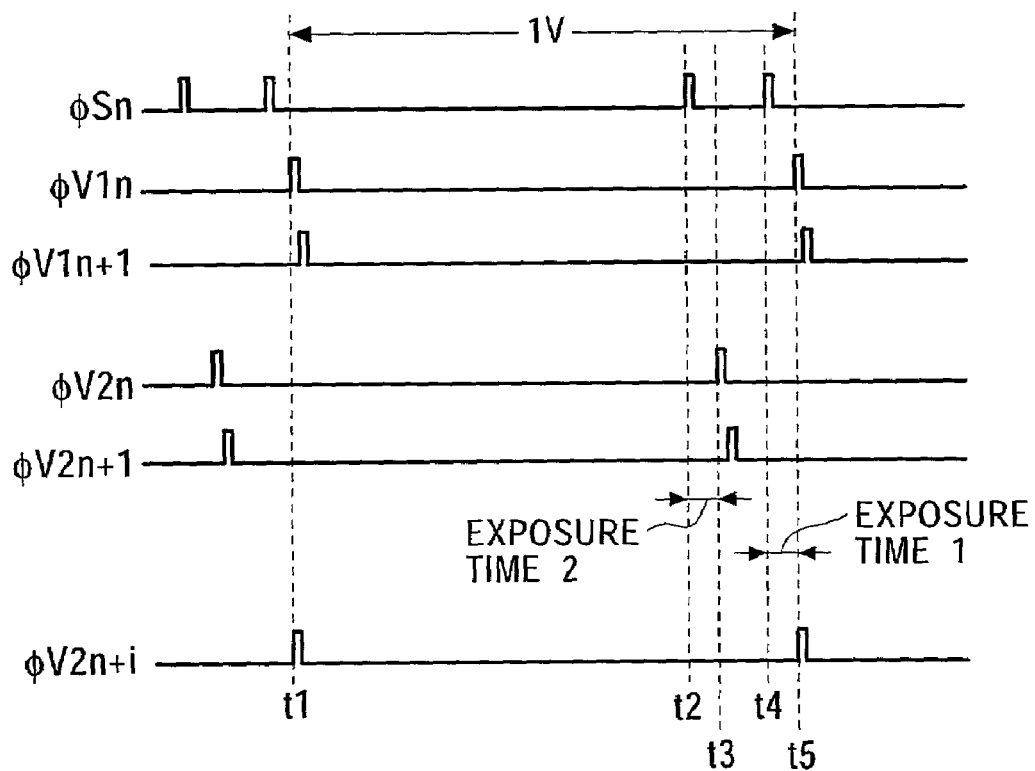
FIG. 3 is a timing diagram for a vertical scan.

The operation of the CMOS imager in accordance with the first embodiment of the present invention is now discussed. The discussion focuses on a particular pixel at an n-th row with reference to a timing diagram in FIG. 3. The timing diagram illustrated in FIG. 3 represents the timing relationship of the shutter pulse φSn and the two vertical scanning pulses φV1n and φV2n during a vertical scan.

Figure 4:
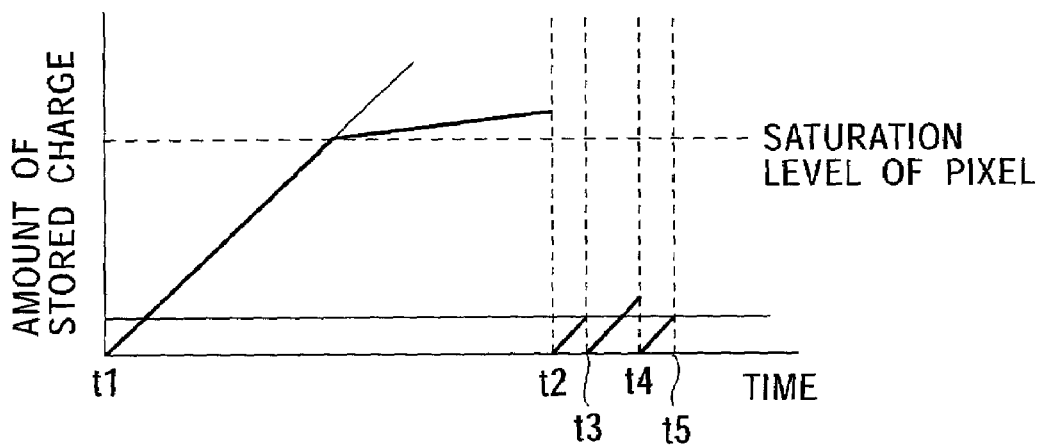
FIG. 4 is a characteristic chart plotting the relationship between time and stored charge in a pixel.

The pixels in the n-th row are selected by the first scanning pulse φV1n output from the first vertical scanning circuit 30. At time t1 at which signals are read from the pixels in the n-th row, storage of the signal charge (electrons in this case) in the pixels in the n-th row starts. In the pixels in the n-th row, the signal charge is stored in proportion to time. With the elapse of some time, the signal charge reaches a saturation level in the pixel as shown in FIG. 4.

With the shutter scanning circuit 32 scanning, the shutter scanning circuit 32 outputs a first shutter pulse φSn to the pixels in the n-th row at time t2. After passing through the OR gate 34n, the shutter pulse φSn is OR-gated with the read pulse φPRD generated by the timing generator 33 through the AND gate 37n. In this way, the n-th row is selectable as an electronic shutter row.

The horizontal scanning circuit 29 successively outputs the horizontal scanning pulses . . . , φHm−1, φHm . . . , and feeds the pixels in an m-th column through the horizontal selection lines . . . , 24m−1, 24m . . . . For example, now, the horizontal scanning pulse φHm is output, and fed to the gate of the read selection transistor 14 of each pixel in the m-th column. When the read pulse φPRD is output from the timing generator 33 during the generation of the horizontal scanning pulse φHm, the read pulse φPRD is AND-gated with the shutter pulse φSn through the AND gate 37n. As a result, a pulse occurs at the read line 23n in the n-th row.

The read selection transistor 14 of the pixel in the m-th column and the n-th row remains on with the horizontal scanning pulse φHm applied to the gate thereof. In the pixel m-th column and the n-th row, the read pulse φPRD applied to the n-th row read line 23n through the AND gate 37n is applied to the gate of the read transistor 13 through the drain-source of the read selection transistor 14.

In this way, the read transistor 13 is turned on. The signal charge, generated by the photodiode 12 through the photoelectric conversion thereof and then stored by the photodiode 12, is read into (drained into) the floating diffusion region FD through the read transistor 13. As a result, the photodiode 12 is emptied. The operation to empty the photodiode 12 is the electronic shutter operation. The electronic shutter operation is successively performed on the pixels in the n-th row in synchronization with the horizontal scanning operation of the horizontal scanning circuit 29.

The second vertical scanning circuit 31 outputs the second vertical scanning pulse φV2n at time t3 through the scanning operation thereof. The second vertical scanning pulse φV2n is applied to the gate of the vertical selection transistor 28n through the vertical selection line 36n. The n-th row is thus selected as a row to be read. With the n-th row selected, the horizontal scanning circuit 29 successively outputs and feeds the horizontal scanning pulses . . . , φHm−1, φHm . . . to the pixels 11 in the m-th column through the horizontal selection lines . . . , 24m−1, 24m, . . .

When the horizontal scanning pulse φHm−1 is output, and fed to the horizontal selection line 24m−1 in the (m−1)-th column, the reset transistor 16 in the pixel in the m-th column is turned on. In this way, the voltage of the floating diffusion region FD is reset to the power source voltage VDD through the reset transistor 16. The horizontal scanning pulse φHm−1 in the (m−1)-th column functions as an m-th column reset pulse adjacent thereto.

The horizontal scanning circuit 29 outputs and applies the horizontal scanning pulse φHm to the gate of the output selection transistor 17 of the pixel in the m-th column through the horizontal scanning line 24m at the m-th column. The output selection transistor 17 is then turned on. In the pixel in the vertically selected n-th row and the horizontally selected m-th column, the current responsive to the reset level of the floating diffusion region FD is fed to the horizontal signal line 22n through the amplifier transistor 15 and the output selection transistor 17, and is then fed to the vertical signal line 26 through the vertical selection transistor 28n.

During the generation of the horizontal scanning pulse φHm, the read pulse φPRD is output. The read pulse φPRD is AND-gated with the vertical scanning pulse φV2n through the AND gate 37n. As a result, a pulse occurs at the read line 23n in the n-th column. The read selection transistor 14 in the m-th column and the n-th row is turned on with the horizontal scanning pulse φHm fed to the gate thereof.

The read pulse φPRD applied to the read line 23n is fed to the gate of the read transistor 13 through the drain-gate of the read selection transistor 14. In this way, the read transistor 13 is turned on, the photodiode 12 performs the photoelectric conversion during the exposure time (exposure time 2) of t3–t2. The signal charge stored in the photodiode 12 is then read into the floating diffusion region FD through the read transistor 13.

When the read pulse φPRD disappears, the read transistor 13 is turned off. The amplifier transistor 15 amplifies the signal charge read into the floating diffusion region FD to a signal current responsive to the amount of charge of the signal charge, and is then output to the vertical signal line 26 through the output selection transistor 17, the horizontal signal line 22n and the vertical selection transistor 28n.

By repeating a first series of steps in the particular pixel in the n-th row as described above, the reset level and the signal level of the pixel are sequentially read into the vertical signal line 26 through the same path (such as the horizontal signal line 22n and the vertical selection transistor 28n). These signals are converted from current to voltage through the I-V converter circuit 39, and are then sent to the CDS circuit 41 for correlated double sampling. Noise canceled signals are then output.

A second shutter pulse φSn is output to the pixels in the n-th row from the shutter scanning circuit 32 at time t4. After passing through the OR gate 34n, the shutter pulse φSn is AND-gated with the read pulse φPRD generated by the timing generator 33 through the AND gate 37n. Through the same operation as when the first shutter pulse φSn is output, the electronic shutter operation for draining the signal charge stored in the photodiode 12 in the same pixel for a duration of t4–t3 is performed to empty the photodiode 12.

The first vertical scanning circuit 30 outputs the first vertical scanning pulse φV1n at time t5, which is 1V (the one vertical scanning period) later from time t1. The first vertical scanning pulse φV1n is then applied to the gate of the vertical selection transistor 27n in the n-th row through the vertical selection line 35n. In this way, the n-th row is selected again as a row to be read. Through the same operation in which the row is selected for the first read cycle, the photoelectric conversion is performed on the same pixel during an exposure time t5-t4 (the exposure time 1). The signal current based on the stored signal charge is read through the vertical selection transistor 27n and the first vertical signal line 25 in synchronization with the horizontal scanning operation by the horizontal scanning circuit 29.

Figure 5:
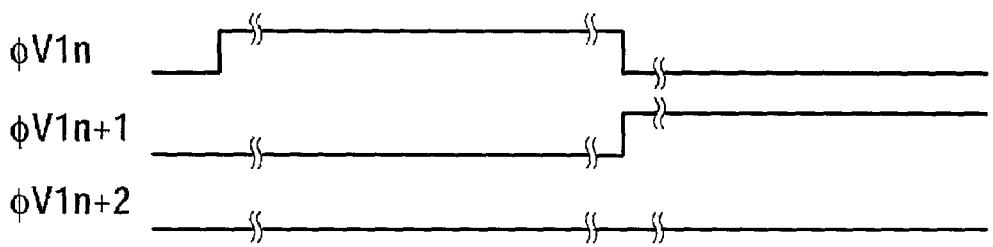
FIG. 5 is a timing diagram during signal reading.
Figure 5:
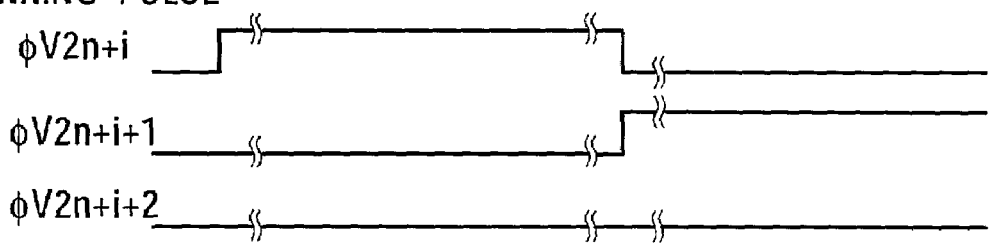
Figure 5:
Figure 5:
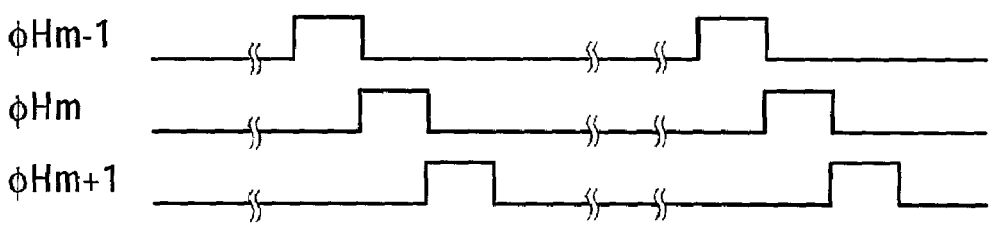
Figure 5:
Figure 5:
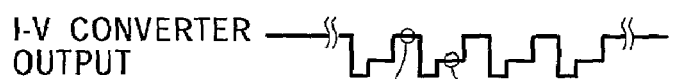

Through the above series of steps, two separate signal charges for the same pixel are stored, and the two signal currents based on these signal charges are read through the respective first and second vertical signal lines 25 and 26. The above-referenced electronic shutter operation is successively repeated for all pixels in the n-th row and the two signal currents are read to the vertical signal lines 35 and 26. The timing of the series of operational steps discussed above is illustrated in FIG. 5.

Figure 6:
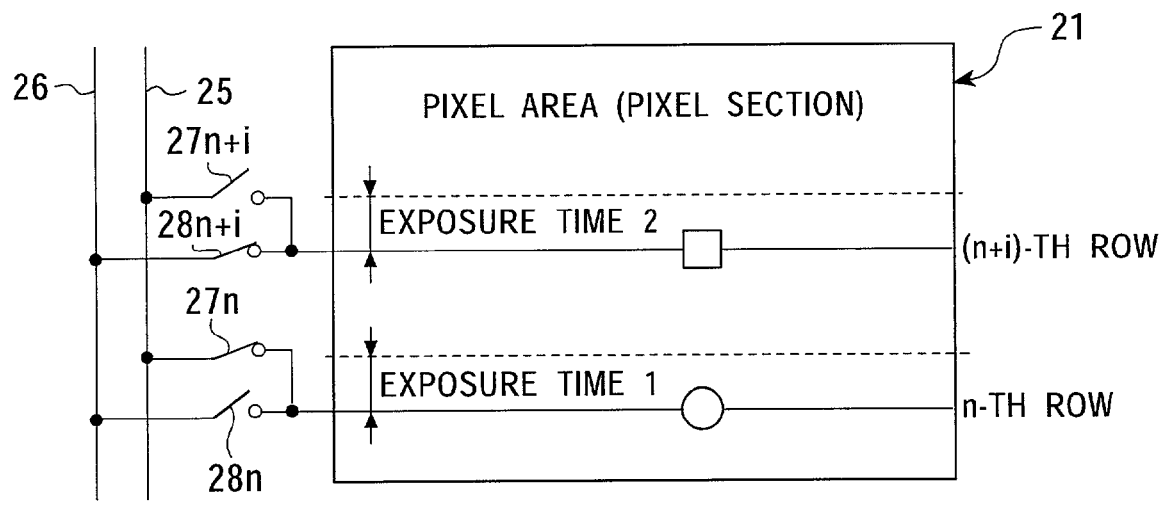
FIG. 6 is a diagram illustrating a vertical scan during the operation of an electronic shutter.

FIG. 6 illustrates the vertical scan at a given time. As seen from the timing diagram in FIG. 3, there is a time difference of t5–t3 between the first signal read timing responsive to the vertical scanning pulse $\phi V2n$ and the second signal read timing responsive to the vertical scanning pulse $\phi V1n$. Referring to FIG. 6, the time difference t5–t3 corresponds to a line interval of i rows. In other words, the two reading operations are performed on the same row, and the time difference t5–t3 is present between the two reading operations. When the reading operation responsive to the exposure time 2 is performed on an (n+i)-th row, the reading operation responsive to the exposure time 1 is performed in the n-th row spaced by i rows. FIG. 6 diagrammatically illustrates these operations.

As already discussed, there is the time difference t5–t3 between the signal current read from the same pixel through the vertical signal line 26 and the signal current read from the same pixel through the vertical signal line 25. For synchronization, the time difference t5–t3 is eliminated by delaying the signal voltage corresponding to the signal current read in advance through the vertical signal line 26 by the time t5–t3 through the delay circuit 42 arranged subsequent to the CDS circuit 41. The two signals synchronized to each other are then output to the subtracter 43. The difference between the two signals is determined, and the resulting difference signal is output on a dot at a time basis.

In the focal-plane shutter type CMOS imager that performs exposure row by row, the pixel signal is read twice at separate timings from the same pixel, and the two signals are synchronized, and then the difference between the two signals is determined. In comparison with the conventional art which compares one frame with another frame, the two signals are compared for an extremely short period of time (the time difference). Using the difference signal, an area of the image nearly equal to the projection area of the object is obtained even when the object moves quickly.

Figure 7:
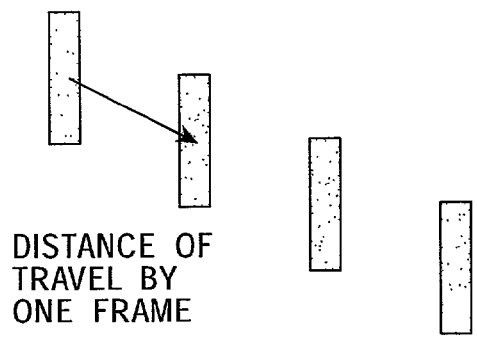
FIG. 7 illustrates a detected motion when a rectangular object is moving at a high speed.

The operation and advantages of the present invention are specifically discussed below. Referring to FIG. 7, an object moves from top left to bottom right. In the solid-state image pickup device having the focal-plane shutter structure, such as the above-referenced CMOS imager, the pixels are different in the timing of the storage start of the signal charge. For simplicity in the discussion that follows, subtraction is performed on an immediately prior frame. If the subtraction result is zero, the object is presented in gray. The object moving is brighter than the background.

Figure 8:
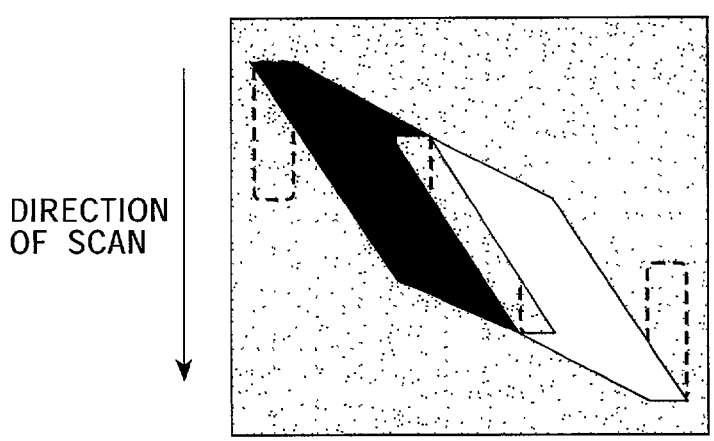
FIG. 8 illustrates comparison results in a conventional art.

The conventional art which compares frames is considered first. In a first frame, a signal corresponding to a rectangular object enters an area painted in black in FIG. 8. In a next frame, a signal corresponding to the rectangular moving object enters an area painted in white. By performing a subtraction operation between the prior frame and the subsequent frame, the image of white and black areas appears as shown in FIG. 8.

Figure 9:
FIG. 9 illustrates the comparison results when a high-speed shutter in the conventional art operates.
Figure 9:
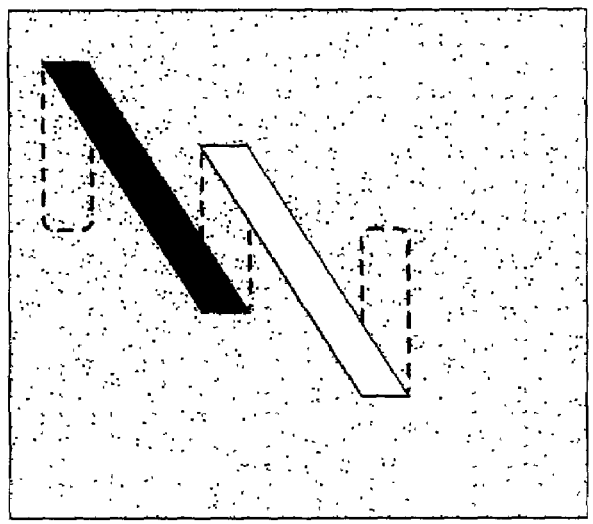

In the conventional art, a high-speed electronic shutter is now triggered. Referring to FIG. 9, the top of the screen and the bottom of the screen are different in the timing of the storage start when the high-speed electronic shutter is triggered. In a first frame, a signal corresponding to a rectangular object enters an area painted in black in FIG. 9. In a next frame, a signal corresponding to the rectangular moving object enters an area painted in white in FIG. 9. By performing a subtraction operation between the prior frame and the subsequent frame, a double image appears with white and black areas as shown in FIG. 9.

Figure 10:
FIG. 10 illustrates the comparison results in the first embodiment of the present invention.
Figure 10:
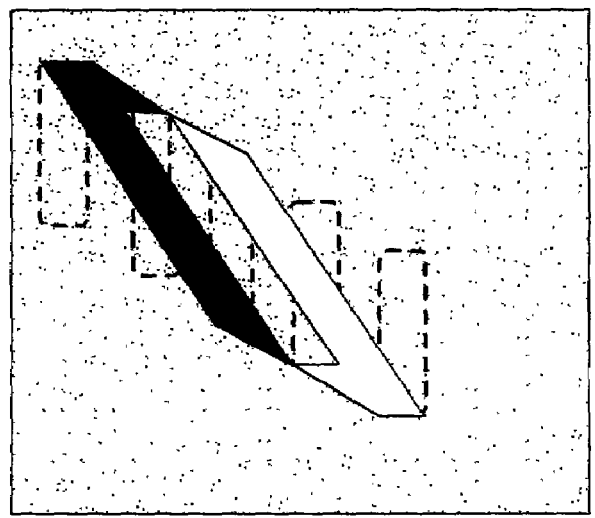

For example, the time difference (corresponding to t4–t2 in FIG. 3) of the two output signals is a 1/2 frame in the above-referenced CMOS imager of the first embodiment. Since the storage time of each frame is a 1/2 frame, a first output signal corresponding to a rectangular moving object enters an area painted in black in FIG. 10. A second output signal corresponding to the rectangular moving object enters an area painted in white in FIG. 10. By performing a subtraction operation between the two signals, an image with white and black areas appears as shown in FIG. 10.

In the conventional art, the comparison operation is performed on the signals for the two frames. In accordance with the first embodiment of the present invention, signals are read from the same pixel at separate timings with the time difference allowed therebetween. The two output signals are set to have the time difference of the 1/2 frame. The comparison process is thus performed on the signals within 1.5 frames. A signal finer than the signal in the conventional art is thus obtained.

Figure 11:
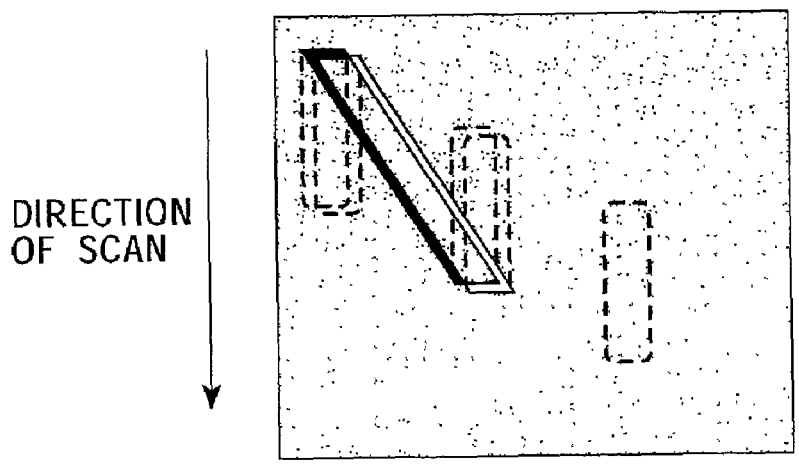
FIG. 11 illustrates the comparison results when a high-speed electronic shutter of the first embodiment operates.

The time difference between the two signals is set to be shorter than the 1/2 frame, and the high-speed electronic shutter is triggered. A first output signal corresponding to a rectangular moving object enters an area painted in black in FIG. 11. A second output signal corresponding to the rectangular moving object enters an area painted in white in FIG. 11. By performing a subtraction operation between the two signals, an image having an area nearly equal to the projection area of the object is presented with the white and black areas as shown in FIG. 11.

Referring to FIG. 8 through FIG. 11, gray areas are present between the black signal and the white signal. These areas are gradually shifted into black or white. For simplification, these areas are presented in gray.

In the above example, the time difference between the two signals, namely, the interval between the two shutter pulses $\phi VSn$ (t4–t2 in FIG. 3) is fixed. Through the timing control by the timing generator 33 shown in FIG. 2, the time difference between the two signals is set to be any desired value in response to the motion speed of the object. The exposure time 1 and the exposure time 2 are set to be equal to each other, but this is not a requirement. However, the exposure time 1 set to be equal to the exposure time 2 causes the difference between the two signals to become zero when the object remains stationary. The determination of whether the object is stationary or not is easy to make.

Since the CMOS imager relating to the above-referenced first embodiment of the present invention detects the motion of the object, the CMOS imager may be used as a detection sensor for a motion detector or an image pickup device for a monitoring camera. Even when an object moves quickly, the image having an area nearly equal to the projection area of the object is presented. A more accurate image recognition is performed. The CMOS imager may thus be used as a speed detector to monitor a vehicle which may be running in excess of a speed limit.

Figure 12:
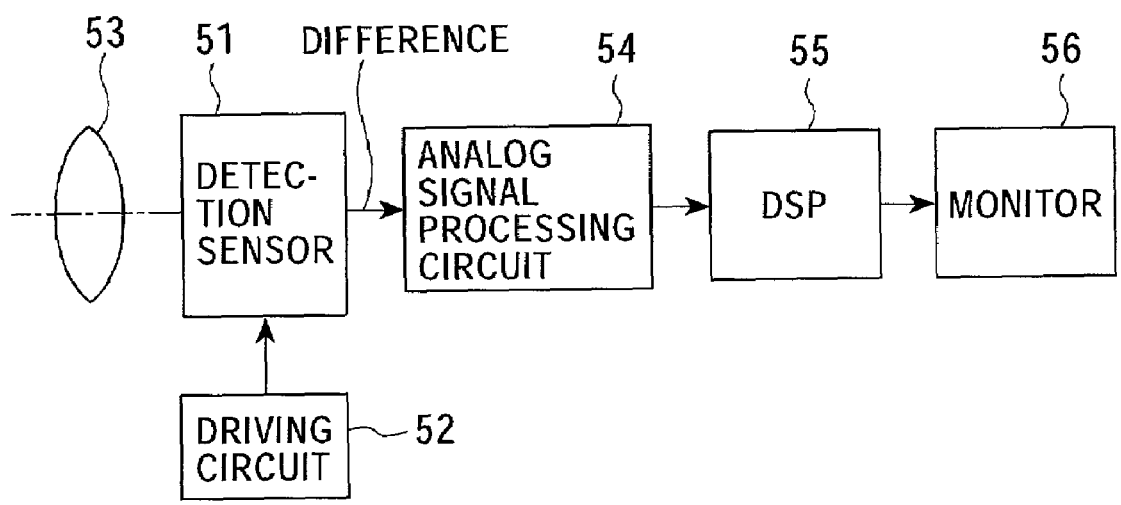
FIG. 12 is a block diagram diagrammatically illustrating the construction of a motion detector in accordance with the first embodiment.

FIG. 12 is a block diagram diagrammatically illustrating the motion detector of the present invention. With reference to FIG. 12, the motion detector of the present invention includes a detection sensor 51, a driving circuit 52, an optical system including a lens 53, an analog signal processing circuit 54, a digital signal processing circuit (DSP) 55, and a monitor 56. The motion detector thus constructed employs the CMOS imager of the first embodiment of the present invention as the detection sensor 51.

The driving circuit 52 provides a master clock and control signals to the timing generator 33 shown in FIG. 2, thereby driving the CMOS imager in the image pickup operation including the electronic shutter operation already discussed. The driving circuit 52 may include a timing generator 33.

The lens 53 focuses incident light from the object (not shown) on the imaging plane of the detection sensor 51.

As already discussed, the detection sensor 51 reads the pixel signal from each pixel twice, and the two signals are synchronized and the difference between the two signals is determined. The difference signal is thus output. The analog signal processing circuit 54 performs analog signal processing on the difference signal, such as a level shifting operation to raise the black level. The level shift process is performed because the determination of the difference between the two signals causes the difference signal to be lower than the black level as already discussed. The level shift process compensates for the black level.

As already discussed, the CMOS imager in accordance with the first embodiment of the present invention includes the CDS circuits 40 and 41, the delay circuit 42, and the subtracter 43. When the COMOS imager is used in the motion detector, the CMOS imager may function to output two signals, and in this case, the CDS circuits 40 and 41, the delay circuit 42, and the subtracter 43 are arranged in the analog signal processing circuit 54.

The difference signal processed by the analog signal processing circuit 54 is then output to the digital signal processing circuit 55. The digital signal processing circuit 55 performs digital signal processing including a white balance adjusting and an automatic gain control, and a calculation for calculating the motion speed of the object based on the difference signal. The difference signal processed by the digital signal processing circuit 55 is fed to the monitor 56. The monitor 56 presents the image of the object based on the difference signal. The monitor 56 may present the motion speed together with the image of the object.

The motion detector for detecting the motion of the object (subject) using the solid-state image pickup device as a sensor includes, as the detection sensor 51, the CMOS imager which reads the pixel signal from one pixel twice, synchronizes the two signals and determines the difference between the two signals. When the object moves quickly, the CMOS imager provides the image having an area nearly equal to the projection area of the object based on the difference signal. The image of the object is accurately recognized.

The motion detector may be used as a speed detector for vehicles running on an expressway. The motion detector detects the speed of a vehicle while reliably recognizing the type of the vehicle and the number and characters printed on a number plate of the vehicle, which may run at a speed above a speed limit, namely, which may be charged with speeding.

In accordance with the first embodiment of the present invention, in the above-referenced solid-state image pickup device or a motion detector which uses the solid-state image pickup device as a detection sensor, two signals read at different timings are synchronized to determine a difference between the two signals and the motion of the object is detected based on the difference. The area of the image nearly equal to the projection area of the object is obtained even when the object moves quickly. In this way, an accurate image of the object is recognized even when the object moves quickly.

A second embodiment of the present invention is discussed in detail below with reference to the drawings, wherein the present invention is applied to an X-Y addressing type solid-state image pickup device such as a CMOS imager.

Figure 13:
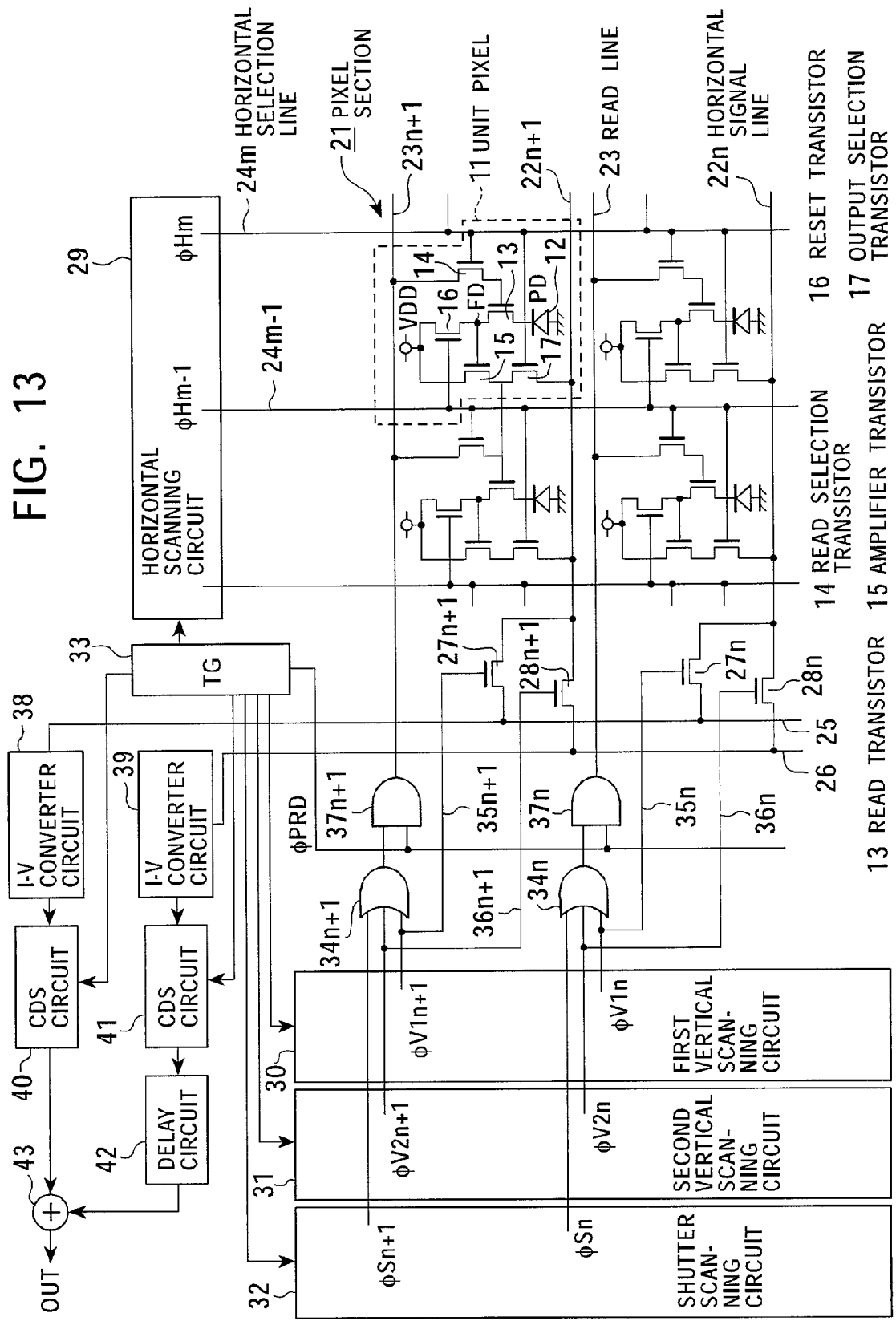
FIG. 13 is a diagram illustrating a CMOS imager in accordance with a second embodiment of the present invention.

FIG. 13 is a block diagram of a CMOS imager in accordance with the second embodiment of the present invention. With reference to FIG. 13, the second embodiment remains unchanged from the first embodiment except that the second embodiment employs an adder 143 instead of the subtracter 43 in the first embodiment, and the general discussion of the second embodiment is omitted.

A variety of signal processing circuits such as an AGC (automatic gain control) circuit or an ADC (analog digital converter) circuit may be added as a stage subsequent to the adder 143.

When the frequency of the AC utility power in the area where the CMOS imager is used is A [Hz], the first and second vertical scanning circuits 30 and 31 successively output two vertical scanning pulses $\phi Vn1$ and $\phi Vn2$, preferably with an interval of 1/4A [s] allowed therebetween. On the other hand, the shutter scanning circuit 32 outputs two shutter pulses $\phi Sn$ so that the same storage time is allowed prior to each of the two vertical scanning pulses $\phi V1n$ and $\phi V2n$. Specifically, the durations between the vertical scanning pulses $\phi V1n$ and $\phi V2n$ and the two respective shutter pulses $\phi Sn$ are equal to each other. The timing relationship of these pulses is determined by a variety of timing pulses provided by the timing generator 33.

The timing diagram, the time versus amount of stored charge characteristics of pixel, and the vertical scan during the electronic shutter operation remain unchanged from those discussed in connection with the first embodiment. The discussion thereof is thus omitted.

When the exposure time 1 (t5–t4) and the exposure time 2 (t3–t2) are set to be 1/2000 [s] in the timing diagram shown in FIG. 2 in the second embodiment of the present invention, signals responsive to the signal charges stored during the exposure times 1 and 2 are consequently added. A shutter speed of 1/1000 [s] is thus set.

When the focal-plane shutter type CMOS imager that performs exposure row by row is used under the illumination of a fluorescent lamp, the pixel signal from one pixel is output twice for example. With the driving frequency A [Hz] of the fluorescent lamp, the two signals are read with a time difference equal to half the flicker frequency, namely, 1/4A [s]. The two signals are then synchronized through the signal processing, and then added to each other into a single pixel signal. The following advantages are thus provided.

If an imaging operation is performed at a frame rate of 30 [frames/s] under the fluorescent lamp illumination driven by a 50 [Hz] AC power source, there occurs a time difference of 5 [ms] (=1/(4×50) [s]). This time difference corresponds to the previously mentioned time difference t5–t3. Referring to the waveform diagram illustrated in FIG. 1, the signal is now read at the timing represented by the ♦ mark. The signal read at the timing of a ▲ mark 5 [ms] before and the signal read at the timing represented by the ♦ mark are synchronized and then added together into a pixel signal. This means that the two read signals are averaged into the pixel signal for one pixel.

Figure 1:
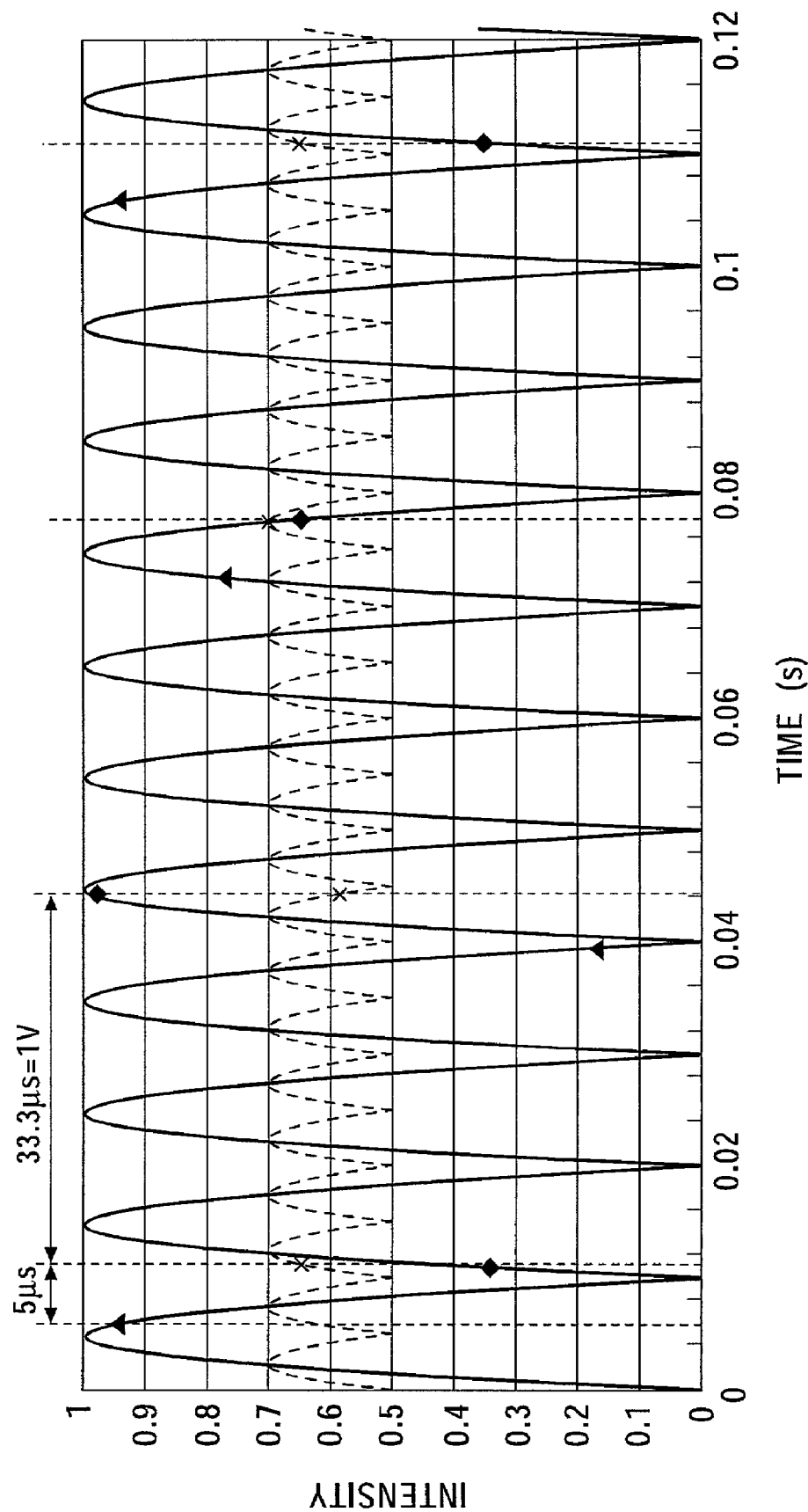
FIG. 1 is a waveform diagram illustrating a change in brightness (intensity) when a high-speed electronic shutter is triggered under illumination by a fluorescent lamp.

In this way, the two signals with the time difference of 5 [ms] therebetween are added into the pixel signal of the same pixel for averaging. Referring to FIG. 1, the signal having an intensity represented by an X mark is obtained. Under this process, if the intensity of the signal is plotted along the wave represented by a solid line in FIG. 1, the intensity is represented by a dotted line. When the signal reading is performed from the pixel at the timing represented by the ♦ mark with the period of about 33.3 (=1/30) [ms] with reference to the waveform diagram illustrated in FIG. 1, the output value greatly changes in a several-fold thereof in intensity.

The signal reading of one pixel is performed twice, and the two signals are read with the time difference equal to half the flicker period, and are then synchronized and added into a single pixel signal. Referring to the waveform diagram in FIG. 1, the output value, which suffers from a variation several times as large as the output value in the conventional art, falls within a variation of tens of percents in this invention. The X-Y addressing type solid-state image pickup device such as the CMOS imager controls a brightness difference between the bright horizontal streak and the dark horizontal streak alternating with each other on a screen, unique to the high-speed electronic shutter under the fluorescent lamp illumination.

In the present invention, the two signals are read from the same pixel at different timings spaced from each other by half the illumination flicker period (=1/4A [s]). This setting is preferable. The effect of reducing the flicker is equally achieved even if the two signals are read from the same pixel at different timings spaced from each other by approximately half the illumination flicker period. The exposure time 1 and the exposure time 2 are set to be equal to each other, but this is not a requirement. However, when the two signals are added and averaged, the variations in the output values are reduced more if the exposure time 1 and the exposure time 2 are set to be equal.

In the second embodiment of the present invention, the imaging operation is performed at a rate of 30 [frames/s] under the fluorescent lamp illumination driven by the 50 [Hz] AC power source. The present invention is not limited to this condition. In the imaging at the other frame rate, or under the fluorescent lamp illumination driven by the 60 [Hz] AC power source, the present invention may be equally applied when the AC power source frequency is not an integer multiple of the frame rate of the solid-state image pickup device.

In the second embodiment of the present invention, the signal during the two cycles of the same exposure durations is output from one pixel. The present invention is not limited to the two exposure cycles. The signals may be output three times, and the resulting three signals may be synchronized and then added together. The more the number of reading cycles, the more the flickering effect is improved.

In the second embodiment of the present invention, the CMOS imager includes the delay circuit 42 and the adder 143. The delay circuit 42 and the adder 143 may be included in a signal processing system of a camera system which incorporates the CMOS imager.

Figure 14:
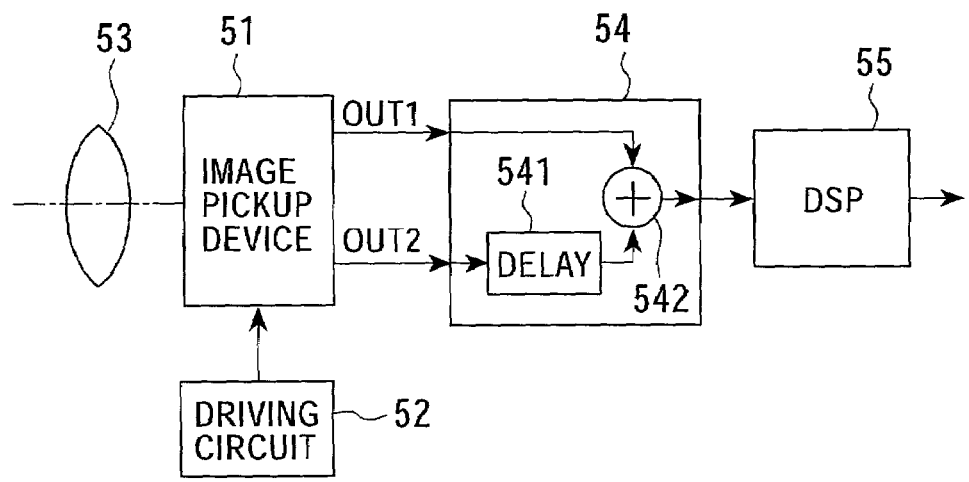
FIG. 14 is a block diagram illustrating the construction of a camera system in accordance with the second embodiment of the present invention.
Figure 15:
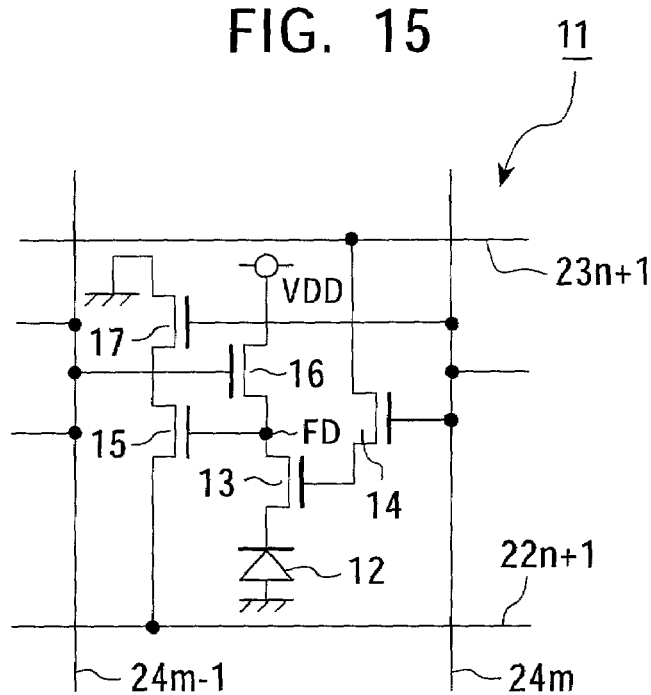
FIG. 15 is a circuit diagram illustrating another arrangement of a unit pixel.

FIG. 14 is a block diagram diagrammatically illustrating the construction of the camera system of the present invention. As seen from FIG. 14, the camera system of the present invention includes an imaging device 51, a driving circuit 52, an optical system including a lens 53, an analog signal processing circuit 54, and a digital signal processing (DSP) circuit 55. In the camera system thus constructed, the CMOS imager of the second embodiment of the present invention is used as the imaging device 51.

In the camera system, the CMOS imager used as the imaging device 51 CDS processes two signals read from the same pixel and then outputs the CDS processed signals. The present invention is not limited to this. Referring to FIG. 13, the CMOS imager may contain the delay circuit 52 and the lens 53.

The driving circuit 52 provides a master clock and control signals to the timing generator 33 shown in FIG. 13, thereby driving the CMOS imager in the image pickup operation including the electronic shutter operation already discussed. The driving circuit 52 may include the timing generator 33.

The lens 53 focuses incident light (image light) from the object (not shown) on the imaging plane of the imaging device 51. In this case, two output signals OTT1 and OUT2 having a time difference therebetween from the same pixel are output pixel by pixel, and are fed to the analog signal processing circuit 54.

The analog signal processing circuit 54 includes a delay circuit 541 and an adder 542. The delay circuit 541 provides a delay time corresponding to the above-mentioned time difference t5–t3, and synchronizes the two signals OTT1 and OUT2 by delaying the signal OUT2 by the delay time with respect to the signal OUT1. The delay circuit 541 may be any known circuit such as a frame memory or a delay line. The synchronized two signals OTT1 and OUT2 are added through the adder 542 into the pixel signal of the one pixel. The pixel signal is successively output. The pixel signal is then subjected to signal processing such as a white balance adjustment and an automatic gain control through the digital signal processing circuit 55.

What is claimed is:

1. A solid-state image pickup device having a pixel section formed of a matrix of unit pixels and successively reading a pixel signal from the pixel section by addressing each unit pixel, comprising:
    exposure control means for dividing exposure time into two durations per pixel in the pixel section,
    signal read means for reading separate signals, from each pixel in the pixel section, based on the two exposure durations set by the exposure control means, and
    signal processor means for synchronizing the two signals read by the signal read means for determining and outputting a difference between the two signals,
    wherein the two exposures are separated by a duration that is substantially equal to half of a flicker period of illumination.

2. A solid-state image pickup device according to claim 1, wherein the exposure control means varies the exposure start time of each of the two exposures.

3. A solid-state image pickup device according to claim 1, wherein the exposure control means sets the two exposure durations to be equal to each other.

4. A solid-state image pickup device having a pixel section formed of a matrix of unit pixels and successively reading a pixel signal from the pixel section by addressing each unit pixel, comprising:
    exposure control means for dividing exposure time into two durations per pixel in the pixel section,
    signal read means for reading separate signals, from each pixel in the pixel section, based on the two exposure durations set by the exposure control means, and
    signal processor means for synchronizing the two signals read by the signal read means for determining and outputting a difference between the two signals,
    wherein the signal read means comprises horizontal signal lines for a plurality of rows with one signal line for each row in the pixel section, two vertical signal lines, each commonly connected to the plurality of horizontal signal lines for the plurality of rows, and two vertical driving means which select the pixels in the pixel section on one row at a time basis, and cause each of the pixels in each row to output two signals at separate timings spaced by a set duration via the horizontal signal lines to the two vertical signal lines.

5. A solid-state image pickup device according to claim 4, wherein the two vertical driving means comprise two vertical selection switches, each connected between each of the horizontal signal lines connected to the plurality of rows of pixels and each of the two vertical signal lines, and two vertical scanning circuits for successively driving the vertical selection switches at different timings any vertical scan operation.

6. A method for driving a solid-state image pickup device having a pixel section formed of a matrix of unit pixels and successively reading a pixel signal from the pixel section by addressing each unit pixel, comprising the steps of:
dividing exposure time into two durations per pixel in the pixel section,
reading separate signals, from each pixel in the pixel section, based on the two exposure durations set by the exposure control means, and
synchronizing the two read signals and determining a difference between the two signals, wherein the two exposures are separated by a duration that is substantially equal to half of a flicker period of illumination.

7. A method for driving a solid-state image pickup device according to claim 6, wherein the exposure start time of each of the two exposures is variable.

8. A method for driving a solid-state image pickup device according to claim 6, wherein the two exposure durations are set to be equal to each other.

9. A motion detector comprising, as a detection sensor, a solid-state image pickup device having a pixel section formed of a matrix of unit pixels and successively reading a pixel signal from the pixel section by addressing each unit pixel, the motion detector detecting the motion of an object based on the output from the detection sensor,
wherein the solid-state image pickup device comprises:
exposure control means for dividing exposure time into two durations per pixel in the pixel section,
signal read means for reading separate signals, from each pixel in the pixel section, based on the two exposure durations set by the exposure control means, and
signal processor means for synchronizing the two signals read by the signal read means and for determining and outputting a difference between the two signals,
wherein the two exposures are separated by a duration that is substantially equal to half of a flicker period of illumination.

10. A solid-state image pickup device having a pixel section formed of a matrix of unit pixels, and successively reading a pixel signal from the pixel section by addressing each unit pixel, comprising:
exposure control means for dividing exposure time into at least two durations per pixel in the pixel section,
signal read means for reading separate signals, from each pixel in the pixel section, based on at least two exposure durations set by the exposure control means, at separate timings spaced by the set duration substantially equal to half a flicker period of illumination, and
signal processor means for synchronizing and summing at least two signals read by the signal read means.

11. A solid-state image pickup device according to claim 10, wherein the exposure control means sets at least two exposure durations to be equal to the each other.

12. A solid-state image pickup device according to claim 10, wherein the signal read means comprises horizontal signal lines for a plurality of rows with one signal line for each row of the pixel section, at least two vertical signal lines, each commonly connected to the plurality of horizontal signal lines for the plurality of rows, and a plurality of vertical driving means which select the pixels in the pixel section on one row at a time basis, and cause each of the pixels in each row to output at least two signals at separate timings spaced by the set duration via the horizontal signal lines to at least two vertical signal lines.

13. A solid-state image pickup device according to claim 10, wherein the plurality of vertical driving means comprise at least two vertical selection switches, each connected between each of the horizontal signal lines connected to the plurality of rows of pixels and each of at least two vertical signal lines, and at least two vertical scanning circuits for successively driving the vertical selection switches at different timings in a vertical scan operation.

14. A method for driving a solid-state image pickup device having a pixel section formed of a matrix of unit pixels, and successively reading a pixel signal from the pixel section by addressing each unit pixel, comprising the steps of:
dividing exposure time into at least two durations per pixel in the pixel section, reading separate signals, from each pixel in the pixel section, based on at least two exposure durations at separate timings spaced by the set duration substantially equal to half a flicker period of illumination, and synchronizing and summing at least two read signals.

15. A method for driving a solid-state image pickup device according to claim 14, wherein at least two exposure durations are set to be equal to each other.

16. A camera system comprising, as an imaging device, and a solid-state image pickup device having a pixel section formed of a matrix of unit pixels and successively reading a pixel signal from the pixel section by addressing each unit pixel,
wherein the image pickup device comprising: exposure control means for dividing exposure time into at least two durations per pixel in the pixel section,
signal read means for reading separate signals, from each pixel in the pixel section, based on at least two exposure durations set by the exposure control means, at separate timings spaced by the set duration substantially equal to half a flicker period of illumination, and signal processor means for synchronizing and summing at least two read signals.

* * * * *